UNITED STATES PATENT OFFICE.

GILBERT McCULLOCH, OF EAST ST. LOUIS, ILLINOIS, ASSIGNOR TO ALUMINUM COMPANY OF AMERICA, OF NIAGARA FALLS, NEW YORK, A CORPORATION OF PENNSYLVANIA.

MANUFACTURE OF ALUMINA.

941,799.  Specification of Letters Patent.  Patented Nov. 30, 1909.

No Drawing.  Application filed April 30, 1909.  Serial No. 493,076.

*To all whom it may concern:*

Be it known that I, GILBERT McCULLOCH, of East St. Louis, county of St. Clair, and State of Illinois, have invented a new and useful Improvement in the Manufacture of Alumina, of which the following is a specification.

My invention is an improvement in the manufacture of alumina, and is applicable to any process of manufacture in which the alumina is precipitated from a solution of sodium aluminate by means of carbon dioxid gas. It is applicable, for example, to the process described in the patent of Charles M. Hall, No. 663,167, dated December 4, 1900. In the practice of such process a solution of sodium aluminate is formed, which may be done by any of the methods known to the art, and alumina is precipitated from it by passing over it or through it gas containing carbon dioxid. In the resultng reaction the carbon dioxid combines with the soda to form sodium carbonate and precipitates the alumina in the form of aluminum hydrate, which may be removed with a filter press, washed, and calcined to form anhydrous alumina which may be employed in the manufacture of aluminum. It has been found that in such processes the solution of sodium aluminate which is made from bauxite carries a considerable proportion of silica which in the ordinary processes of precipitation by means of carbon dioxid is precipitated along with the alumina and thus contaminates the product. I have discovered that in the process of precipitation the alumina is precipitated first and that the silica is mainly precipitated at the end of the operation; and have discovered that by arresting the precipitation before it is completed the bulk of the silica may be retained in solution along with a portion of the alumina and the sodium carbonate and may be run back to the digesters for treatment with additional bauxite and caustic lime, as described, for example, in the patent of Charles H. Hall, No. 663,167, to form a new solution of sodium aluminate. The silica which is thus returned with the sodium carbonate liquor to the digesters does not accumulate in the liquor, but acts as the silica which is introduced as an impurity with the bauxite. The great bulk of the silica present, namely, that which is in the solution and that which is introduced with the bauxite, remains in undissolved form with the undissolved portions of the bauxite and calcium carbonate, if lime is used, and constitutes what is known in the art as "red mud."

The following is an example of the practice of my invention in the form which I prefer. In carrying out my process I take a liquor of approximately the following composition: $Al_2O_3$, 75 to 80 grams per liter; $Na_2CO_3$, 40 to 50 grams per liter; $Na_2O$ combined with $Al_2O_3$, and reckoned as $NaOH$, 105 to 115 grams per liter; $SiO_2$, .15 to .25 grams per liter. I then charge this liquor into an agitator, which is preferably a long steel cylindrical tank. In this agitator I keep the liquor well stirred by paddles and pass over it $CO_2$ gas, preferably from a lime kiln, which contains usually 23 or 24 per cent. of $CO_2$. The $CO_2$ gas reacts with the sodium aluminate, forming $Na_2CO_3$ and aluminum hydrate until the alumina present in solution has been reduced to 5 to 10 grams per liter. The composition of the liquor is then about as follows: $Al_2O_3$, 5 to 15 grams per liter; $Na_2O$, combined with $Al_2O_3$, and reckoned as $NaOH$, 10 to 20 grams per liter; $SiO_2$, .10 to .20 grams per liter, $Na_2CO_3$, 185 to 195 grams per liter.

I have found that as the alumina is precipitated out of the liquor, by the action of the $CO_2$ gas, the silica is also precipitated, but not in the same ratio, as the alumina. The following table shows approximately the ratio at which the alumina and silica precipitate out where the original solution contains approximately .25 grams of silica per liter.

| When 50% of alumina has been precipitated, | 4% of silica has been precipitated. |
|---|---|
| " 75% " " " " | 8% " |
| " 80% " " " " | 12% " |
| " 87% " " " " | 25% " |
| " 94% " " " " | 80% " |
| " 100% " " " " | 100% " |

With a liquor containing more silica the ratio tends to lessen earlier in the reaction, while in a liquor containing less silica the ratio tends to lessen later in the reaction. From the silica content of the liquor I am enabled to determine just when to stop the precipitation to obtain any degree of purity desired from the silica standpoint.

The above simply serves as an example, as with solutions containing more silica the precipitation would be stopped earlier, and with solutions containing less silica the precipitation may be continued until a larger proportion of alumina is precipitated.

Instead of filtering the aluminum hydrate and running the liquor back to the digesters to take up a new charge of alumina from bauxite, the liquor containing a small proportion of alumina may after filteration be run back to the agitators or to other agitators and the precipitation completed by means of $CO_2$ gas, giving a quantity of an inferior grade of aluminum hydrate which would be useful for some purposes.

I claim:

1. In the process of manufacture of alumina by the alkaline process wherein the alumina is precipitated from a solution of sodium aluminate by $CO_2$ gas, the improvement which consists in arresting the precipitation after a large proportion of the alumina has been precipitated from the solution, whereby a large proportion of the contained silica is retained in the solution.

2. In the process of manufacture of alumina by the alkaline process wherein the alumina is precipitated from a solution of sodium aluminate by $CO_2$ gas, the improvement which consists in arresting the precipitation after a large proportion of the alumina has been precipitated from the solution whereby a large proportion of the contained silica is retained in the solution, and withdrawing the liquor containing the residual silica and alumina and using it as a basis for dissolving other alumina from bauxite.

3. In the process of manufacture of alumina by the alkaline process wherein the alumina is precipitated from a solution of sodium aluminate by $CO_2$ gas, the improvement which consists in arresting the precipitation after a large proportion of the alumina has been precipitated from the solution and before the precipitation of a considerable proportion of the contained silica and thereafter drawing off the solution and completing the precipitation of the alumina by additions of $CO_2$ gas.

In testimony whereof, I have hereunto set my hand.

GILBERT McCULLOCH.

Witnesses:
L. E. MODGLIN,
SUE B. DAVIS.